July 4, 1939.  E. W. EVANS  2,164,807

FISHHOOK

Filed Feb. 16, 1937

Inventor
E. W. Evans
By Watson E. Coleman
Attorney

Patented July 4, 1939

2,164,807

UNITED STATES PATENT OFFICE 2,164,807

FISHHOOK

Edward Whiting Evans, Brooklyn, N. Y.

Application February 16, 1937, Serial No. 126,084

3 Claims. (Cl. 43—27)

This invention relates to hooks for use in catching broad-billed sword fish, marlin, tuna, bluefish, striped-bass, pollack, dolphins, amber-jacks, sail-fish, albacore, barracuda, tarpon and other game fish.

The general object of the invention is the provision of a hook which will have easier access to the mouth of a fish and which is so designed that it will more readily pierce the tissue, will not cut out of the tissue or pull out, and will have greater tensile strength.

My invention consists in the particular shape of the shank and the curvature of the shank and bill, the relation between the eye end of the shank and the extreme point of the bill, and the particular formation of the barb.

The detailed objects secured by the peculiar shape of the hook will be better understood after the detailed peculiarities of the hook have been described.

The hook is illustrated in the accompanying drawing wherein.

Figure 1:
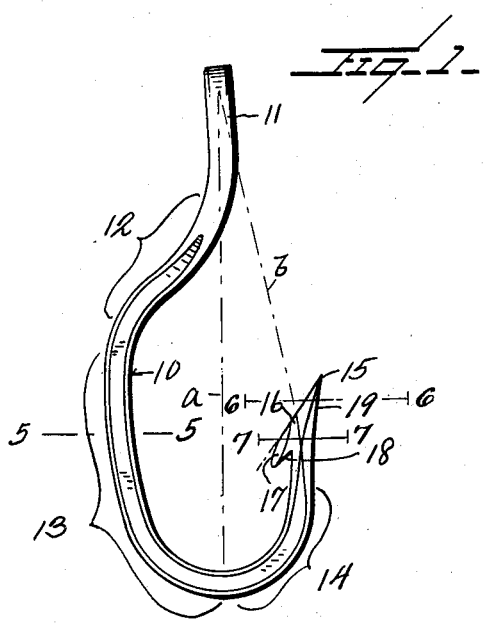
Figure 1 is a side view thereof.
Figure 2:
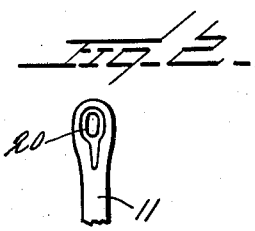
Figure 2 is a fragmentary elevation or front view of the eye end of the hook.
Figure 6:
Figure 6 is a sectional view on the line 6—6 of Figure 1.
Figure 7:
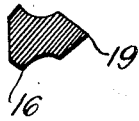
Figure 7 is a sectional view on the line 7—7 of Figure 1.
Figure 4:
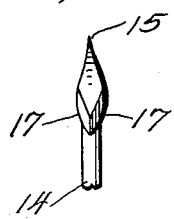
Figure 4 is a fragmentary rear elevation of the bill and barb.
Figure 3:
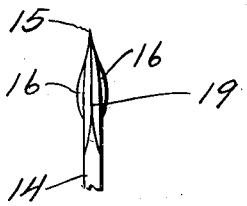
Figure 3 is a front elevation of the bill and barb of the hook.

Referring to this drawing, 10 designates generally the shank of the hook which as usual merges into the bill of the hook, the bill being provided with a point and a barb. The shank 10 from the eye end 11 extends laterally outward, that is, away from the point of the hook and toward the base or curved portion of the hook, as at 12. Beyond the portion 12, the shank is continued toward the base of the hook in an inward curve, as at 13. From the end of the portion 13, the hook is formed to provide an upwardly curved bill 14, the bill of the hook and the adjacent portion 13 being curved in a semicircle so that the bill of the hook will be disposed almost directly beneath the eye end 11 of the hook. At the end of the portion 14, the bill extends nearly in a straight line approximately parallel to the inner flattened face of the eye end 11 of the shank. The end of the bill is very finely pointed, as at 15, and rearward of this point is formed with a barb 16. From the extreme point 15 rearward, the bill is gradually broadened out in a curve and then narrowed to the rounded rear end of the barb 16, as shown in Figures 3 and 4. This inner face of the barb is either longitudinally and transversely flat or may be very slightly curved downward and rearward, as shown in Figure 1. The rear lateral margins of the inner face of the barb 16 are beveled or rounded off, as at 17, and the rear portion of the barb 16 over hangs the bill at 18. The bill, from a point just below this overhanging portion 18, is approximately straight and sharpened, as at 19, to a very fine cutting edge.

Figure 5:
Figure 5 is a section on the line 5—5 of Figure 1.

The eye end 11 of the shank is flattened and widened towards its extremity and provided with an eye 20. The body of the shank is slightly flattened on its opposite faces, as shown in Figure 5. The bill portion 14 is gradually reduced in cross-section to the point of the hook.

It will be seen from Figure 1 that a line $a$ extending through the middle plane of the eye end 11 of the shank will approximately bi-sect the curved base of the hook and that the point and barb of the hook is disposed very close to this line $a$.

The ordinary hook extends practically straight downward and then is curved outward and upward to the point of the hook. It is particularly pointed out that in my hook, the shank is curved from the eye end 11 outward and away from the point of the hook, then downward and inward, and then is curved laterally outward and straight upward to the point of the hook. The peculiar curvature of the portions 12, 13 and 14 and the position of the pointed end of the hook with relation to the eye end secures a straight pull at the base of the hook, thus lessening the possibility of the hook straightening out and giving a line of tension $b$ at an angle of approximately 20° to line $a$. This causes the hook to sink further into the tissue when under load. The hook constructed in accordance with my invention easily enters the mouth of a fish but renders it difficult for the hook to come out of the mouth without hooking into some part of the mouth. The angle of the line of tension $b$ is such that the hook will travel more deeply into the tissue when the line carrying the hook is under tension. The flat or convex surface on the inside face of the barb 16 with the beveled or rounded edges 18 prevents the hook from cutting out from the tissue under tension, that is, under strain approximately in the direction of the line $e$. The beveled surfaces 17 at the side margins of the barb facilitate the entrance of the hook into the tissue. The extremity of the hook has three cutting edges, namely, the cutting edges on the sides of the barb at the forward portion thereof and the cutting edge 19, these three edges merging together at the point 14, thus permitting the hook to cut easily into heavy tissues while the flat or convex inner surface of the barb prevents the point from cutting out of the mouth. The outer edge surfaces of the barb are slightly concave to emphasize the cutting edges. The inside edge of the barb is rounded and broad so as to make it difficult for the hook to emerge once it is embedded. The end of the shank is flattened and widened slightly to give a maximum strength to the eye end of the shank.

It is to be particularly noted that the relative curve of the shank and bill makes it possible to conceal almost the entire hook within mackerel or squid bait and, furthermore, this curve of the shank secures a direct pull and balance for trolling purposes.

It is also to be noted that a line approximately parallel to the inwardly extending portion 13 of the shank and intersecting the portion 12 of the shank and the portion 14 constitutes the major axis of an oval, this major axis being at an angle to the line *a*. The bill portion of the hook is relatively narrow from the bill to the portion 13 of the shank, thus giving a narrow base curve to the hook with a nearly straight point. The point of the hook is outside of a circle drawn to touch the outer face of the curved base portion of the hook.

It will be observed from Figure 1 that the line *a* constitutes the line of tension when a fish is on or entirely hooked, while the line *b* constitutes the line of tension when the fish is being hooked. It is to be noted that the inner surface of the point of my hook is flat. This surface is at an angle with the central line of the hook, thus when a fish is "on" the hook, the harder the pull, the more the flat surface planes itself deep into the tissue. This point of the hook with its cutting edge 19 and its relatively wide barb having lateral cutting edges at the forward ends of their side edges causes this hook to penetrate deeply and causes the point of the hook to cut through bony tissue as well. My structure gives a more direct pull upon the point of the hook, because the point of the hook is located so closely adjacent to the line *a*. The pull on the line of tension *b*, when a fish bites, tends to cause the ordinary hook to tear out, but with my hook, on the contrary, the plane relatively wide inside surface of the barb portion of the hook causes it to plane outward into the fish instead of tearing out.

What is claimed is:

1. A fish hook having a shank extending laterally outward from the eye, then extending inward and away from the eye and curved in an approximate semi-circle and then extending tangentially to form a pointed extremity, the pointed extremity of the hook having an inwardly and rearwardly extending barb having a relatively flat inside face and transversely wider than the extremity of the hook, the lateral edges at the rear of said barb being beveled and the forward edges being sharpened, the extremity of the hook portion outward of the transversely extending barb having a sharp cutting edge.

2. A fish hook having a shank formed with an eye and extending longitudinally and then laterally outward, then extending inward and away from the eye portion of the shank and curved in an approximate semi-circle and terminating in a bill extending at a slight outward inclination with relation to a line passing longitudinally through the shank whereby the tip of the bill is positioned outside of a line extending from the eye end of the shank across the front side of the part of the semi-circle adjacent the bill, the inner face of the bill having an inwardly and rearwardly extending barb transversely wider than the bill of the hook and having a relatively wide flat inside face extending at an outward inclination relative to the longitudinal portion of the shank, the lateral edges of the barb being knife-edged and the outer edge of the bill being sharp-edged from the point of the bill rearward to a point approximately opposite the rear end of the barb.

3. A fish hook having a shank formed with an eye and extending longitudinally, then laterally outward, then extending downward and inward and away from the eye in an approximately semi-circular curve and terminating in a bill extending outward at a slight inclination with relation to the longitudinal portion of the shank, a line coincident with the longitudinal eyed portion of the shank bi-secting said semi-circular portion, the inner face of the bill having an inwardly and rearwardly extending barb transversely wider than the outer extremity of the bill and having a relatively wide flat inside face extending at an outward inclination relative to the longitudinal portion of the shank, the lateral edges of the forward portion of the barb being sharp and the lateral edges of the rear portion of the barb being beveled laterally and outwardly to form a sharp cutting edge, the outer edge of the bill from its point rearward to a position approximately opposite the rear end of the barb being knife-edged.

EDWARD WHITING EVANS.